United States Patent [19]

Lee et al.

[11] Patent Number: 5,781,452

[45] Date of Patent: Jul. 14, 1998

[54] METHOD AND APPARATUS FOR EFFICIENT DECOMPRESSION OF HIGH QUALITY DIGITAL AUDIO

[75] Inventors: Don Hoon Lee, Stamford, Conn.; Subramania Sudharsanan, Shrewsbury, Mass.

[73] Assignee: International Business Machines Corporation, Armonk, N.Y.

[21] Appl. No.: 408,430

[22] Filed: Mar. 22, 1995

[51] Int. Cl.[6] .................................................. H03M 13/00
[52] U.S. Cl. ........................ 364/572; 364/725; 364/514 A
[58] Field of Search ............................ 364/725, 514 A, 364/572; 348/415, 416; 381/29, 30; 395/2

[56] References Cited

U.S. PATENT DOCUMENTS

| | | | |
|---|---|---|---|
| 4,184,049 | 1/1980 | Crochiere et al. | 179/1 |
| 4,622,680 | 11/1986 | Zinser | 375/25 |
| 4,704,730 | 11/1987 | Turner et al. | 381/36 |
| 4,868,867 | 9/1989 | Davidson et al. | 381/36 |
| 4,896,362 | 1/1990 | Veldhuis et al. | 381/30 |
| 4,922,537 | 5/1990 | Frederiksen | 381/31 |
| 4,972,484 | 11/1990 | Theile et al. | 381/37 |
| 5,054,075 | 10/1991 | Hong et al. | 381/36 |
| 5,105,463 | 4/1992 | Veldhuis et al. | 381/30 |
| 5,199,078 | 3/1993 | Orgimeister | 381/47 |
| 5,508,949 | 4/1996 | Konstantinides | 364/725 |

OTHER PUBLICATIONS

MPEG, Oct. 5, 1994, pp. 40–44, section 2.4.3, "*The Audio Decoding Process*".

An article by Davis Pam of Digital Equipment Corp., SPIE vol. 2187, pp. 262–266.

*Primary Examiner*—James P. Trammell
*Assistant Examiner*—Kamini Shah
*Attorney, Agent, or Firm*—Daniel E. McConnell; Andrew J. Dillon

[57] ABSTRACT

A method and apparatus for processing a digital data stream digital including a plurality of samples representing an audio signal. The plurality of samples are requantized. The plurality of requantized samples are filtered using a fast Fourier transform, wherein pulse code modulated samples are created from the plurality of requantized samples.

7 Claims, 4 Drawing Sheets

METHOD AND APPARATUS FOR EFFICIENT DECOMPRESSION OF HIGH QUALITY DIGITAL AUDIO

BACKGROUND OF THE INVENTION

1. Technical Field

The present invention relates in general to an improved method and apparatus for efficiently transmitting data from a source apparatus to a receiving apparatus. In particular to the present invention relates to a method and apparatus for decompressing data for transmission. Still more particularly, the present invention relates to a method and apparatus for decompressing digital audio data.

2. Description of the Related Art

Within a data processing system, a system data bus may be utilized to transmit data to and from a central processing unit, direct access storage devices, communications input/output processors (IOPs), and other peripheral devices. Typically, only one of the several devices connected to the system data bus is able to transmit at any given moment. One of the parameters which establishes the volume of information that the system data bus can transfer within a given period of time, or the capacity of the system data bus, is the bandwidth of the system data bus. The bandwidth of a data bus is the rate, expressed in bytes per second, at which data can be conveyed from a source to a target, such as a workstation or other receiving device connected on the bus. Such bandwidth is limited by the electrical characteristics of the transceivers connected to the system data bus, and the electrical characteristics of the system data bus itself.

Similarly, a communication link may be utilized to transmit data from a source processor to a workstation within a distributed data processing system. Such a communication link also has a finite bandwidth which limits the capacity or volume of information that may be transmitted via the communications link.

In data bus design, and in communication link design, data transmission capacity is a resource that may be divided among several devices connected to such communication channels. As more devices are connected to such communications channels, and as the volume of data communicated between devices on such channels increases, the need to conserve channel capacity and optimize channel usage becomes increasingly important.

Recently, data processing systems have been utilized to process, present, and transmit files containing multimedia data. Multimedia data is a collection of "time-related" or "time-based" data files which may be utilized to represent video, sound, and animation. Such multimedia data files are typically quite large. For example, at 300 pixels per inch and 24 bits per pixel, an 8½-by-11-inch color picture requires more than 25 megabytes of data storage.

In order for a workstation to "play back" the digital audio portion of a multimedia presentation consisting of 16-bit samples in stereo at a sample rate of 44.1 kilohertz (CD audio quality), the workstation must receive 176 kilobytes of sound data per second. Full screen digital video at a resolution of 640 by 480 pixels utilizing 256 colors and a frame rate of 15 frames per second requires the transmission of 36.9 million bits per second to the presenting workstation. Additional colors, pixels, or frames per second further increases these data transmission requirements.

High quality digital audio such as the one provided by compact disc (CD) demands large amounts storage. For example, CD music (44.1 kHz sampling rate, stereo) having 16 bits of resolution per sample requires 176.4k Bytes of space for storing or transmitting one second worth of data. These storage requirements for high quality digital audio is another factor that has prompted usage of compression techniques in multimedia computing systems.

One method of increasing the capacity of a system data bus, a communications link, or reducing the storage space required for digital audio is to transmit data or store the digital data in a compressed format. Data compression is the process of eliminating gaps, empty fields, redundancies, and unnecessary data in order to shorten the length of a data file.

For many years, software and hardware designers have employed various data compression schemes to increase the efficiency of data communication channels and storage devices. An example of one such data compression scheme is the Moving Pictures Experts Group (MPEG) standard. MPEG is part of a joint technical committee of the International Standards Organization (ISO) and the International Electrotechnical Commission (IEC). The MPEG standards for audio may be found in ISO-IEC/JTC1 SC29/WG11, *Coding Of Moving Pictures And Associated Audio For Digital Storage Media At Up to About 1.5 Mbits/s—Part 3: Audio*, DIS. 11172, April 1992.

Basically, MPEG sets forth standards for data compression and may be applied to various signals such as audio and video. Generally, the compression of any data object, such as a page of text, an image, a segment of speech or music, or a video sequence may be thought of as a series of steps, including: (1) a decomposition of that object into a collection of "tokens"; (2) the representation of those tokens by binary strings which have a minimal length in some sense; and (3) the concatenation of the strings in a well defined order. With respect to audio data, subband coding is employed to compress audio data. In compressing audio data, the tokens for audio data are subbands. A "subband" is a frequency band in a frequency domain.

With respect to high quality music, decoding devices are is initially marketed in play-back environments. It is of special interest to consider decoding complexity to reduce the demands on the hardware employed to decompress the digital data stored in compressed formats, such as those defined by MPEG.

Therefore, it would be advantageous to have a method and apparatus that provides an MPEG decoding process or any other decoding process that reduces the amount of computation required by hardware to decompress digital data.

SUMMARY OF THE INVENTION

It is therefore one object of the present invention to provide an improved method and apparatus for efficiently transmitting data from a source apparatus to a receiving apparatus.

It is another object of the present invention to provide a method and apparatus for decompressing data for transmission.

It is yet another object of the present invention to provide a method and apparatus for efficiently decompressing high quality digital audio data.

The foregoing objects are achieved as is now described. The present invention provides The present invention provides a method and apparatus for processing a digital data stream digital including a plurality of samples representing an audio signal. The plurality of samples are requantized. The plurality of requantized samples are filtered using a fast Fourier transform, wherein pulse code modulated samples are created from the plurality of requantized samples.

The filtering includes performing subband synthesis on the plurality of requantized samples using a real valued fast Fourier transform. The requantized samples may be filtered using a real valued fast Fourier transform that includes determining $\alpha_i$ using the real valued fast Fourier transform, wherein $\alpha_i$ is determined using:

$$\alpha_i = \sum_{k=0}^{N/2-1} \exp(-j2\pi k/N)|s_k \exp(-(j2\pi k/N)(N/4))|$$

where i is an index for summation, k is the number of requantized subband samples, $s_k$ are requantized subband samples, N is 64 and creating the plurality of requantized samples using:

$$v_i = 2|\Re(a_i) \cos \mu_i + \Im(a_i) \sin \mu_i|, i=0, 1, \ldots, 63$$

where $v_i$ are the pulse code modulated samples, i is an index (for 64 values) that runs from 0 through 64, j is $\sqrt{-1}$, i is an index number and $\mu_i$ is equal to $\pi$ (i/N+1/4).

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
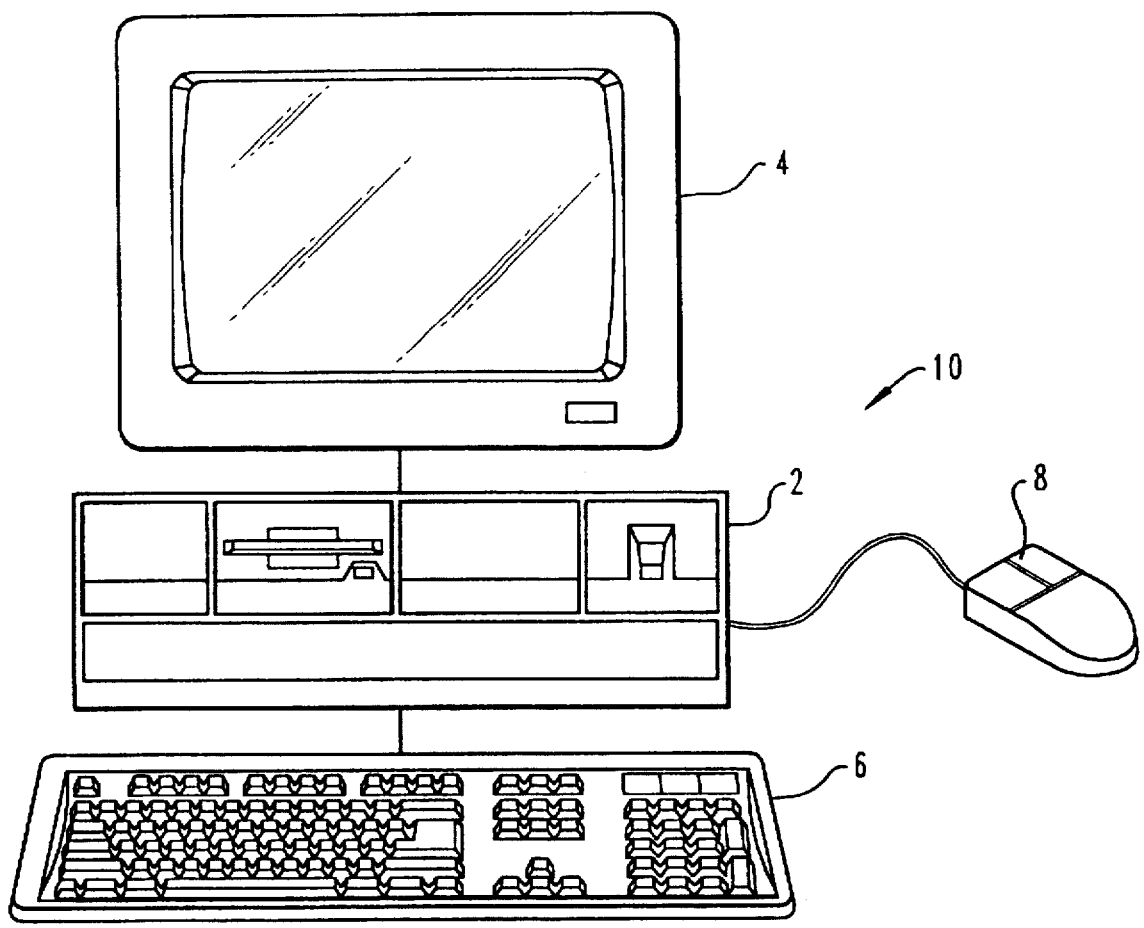
FIG. 1 is an illustration of a data processing system is depicted in which the present invention may be implemented.

With reference now to the figures and in particular with reference to FIG. 1, an illustration of a data processing system is depicted in which the present invention may be implemented. Data processing system 10 includes a system unit 2, a video display terminal 4, a keyboard 6, and a mouse 8. Data processing system 10 may be implemented utilizing any suitable computer, such as an IBM PS/2 or IBM RISC SYSTEM/6000 computer, both products on International Business Machines Corporation, located in Armonk, N.Y. "PS/2" and RISC SYSTEM/6000" are trademarks of International Business Machines Corporation. Although, the depicted embodiment is a personal computer, a preferred embodiment of the present invention may be implemented in other types of data processing systems, such as, for example, intelligent workstations, mini computers, local area networks, or special purpose multimedia devices using standard digital signal processors.

Figure 2:
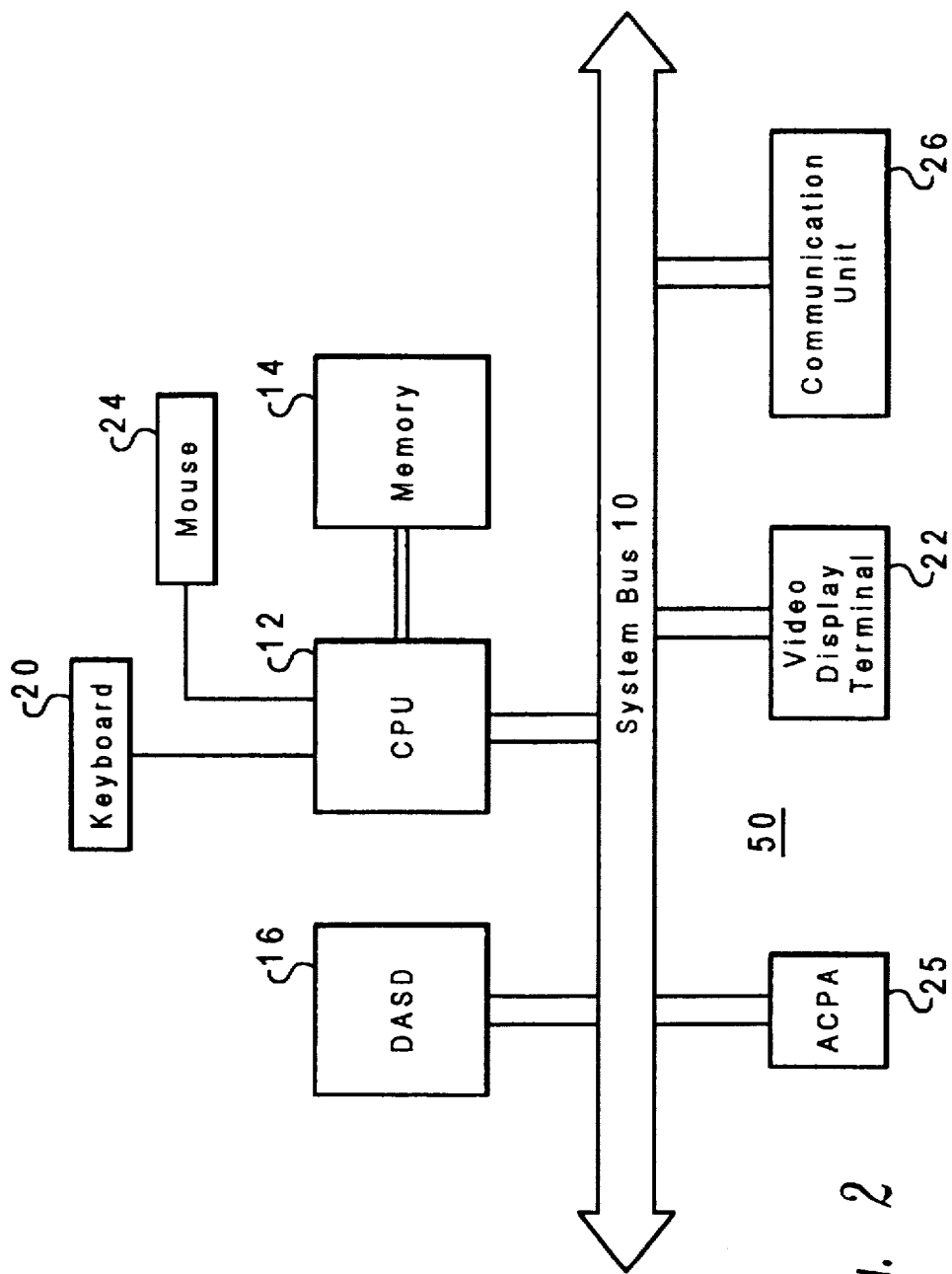
FIG. 2 is a block diagram of a data processing system in accordance with a preferred embodiment of the present invention.

Referring now to FIG. 2, a block diagram of a data processing system 10 in FIG. 1 is illustrated in accordance with a preferred embodiment of the present invention. System bus 11 provides a connection between various components within data processing system 10. Central processing unit (CPU) 12 provides the decision making capability in data processing system 10. CPU 12 may include one or more processors, such as an 80486 processor or a Pentium processor available form Intel Corporation in Santa Clara, Calif. "Pentium" is a trademark of Intel Corporation. Other processors that may be used include Power PC available from IBM/Motoral or Alpha AXP processors from Digital Equipment Corporation.

Memory 14 provides a storage for data processing system 10 and may include both read only memory (ROM) and random access memory (RAM). Direct access storage device (DASD) 16 provides additional storage for data processing system 10. DASD 16 typically provides long term storage for data processing system 10. DASD 16 may include, for example, a hard disk drive or a floppy disk drive.

Various peripherals, such as keyboard 20, video display terminal 22, and mouse 24 may be utilized to interact with data processing system 10. According to a preferred embodiment of the present invention, an audio capture and playback adapter (ACPA) 25 may be employed to obtain audio samples. Specifically, an IBM Audio Capture and Playback Adapter, available from International Business Machines Corporation, may be utilized. Popular Sound Blaster and other sound cards may also be utilized. If audio data can be directly read from the CD or DAT, these sources also may be utilized.

Communications unit 26 provides the interface between the data processing system 10 and some other data processing system such as another personal computer or a network.

The digital audio signal processed by the present invention may originate from stored data in DASD 16, or may be received at communications unit 26, or from some other source of data that is connected to the data processing system, such as ACPA 25.

A preferred embodiment of the present invention may be implemented in an IBM RISC SYSTEM/6000 computer, which is a product of International Business Machines Corporation, located in Armonk, N.Y. "RISC SYSTEM/6000" is a trademark of International Business Machines Corporation. The processes of the present invention may be implemented within the data processing system depicted in FIGS. 1 and 2 or in hardware.

Figure 3:
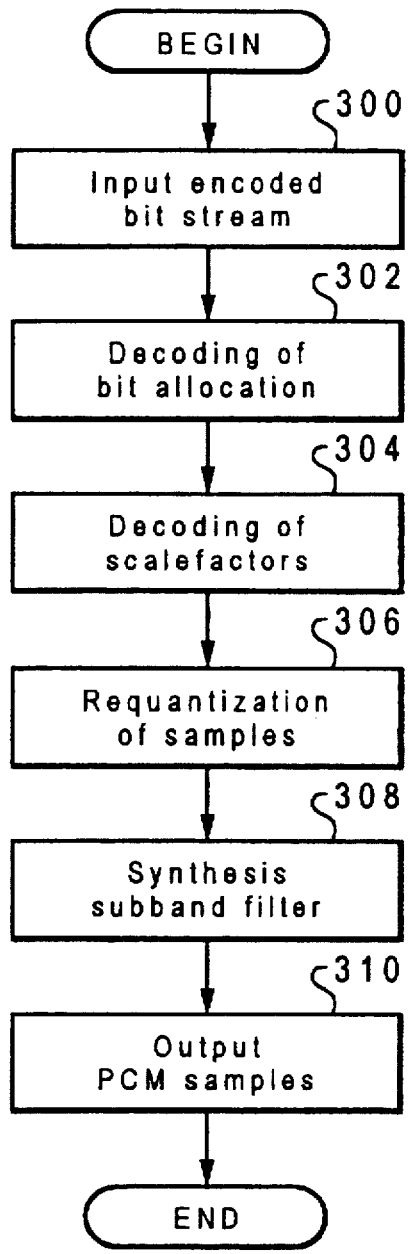
FIG. 3 is a flowchart of a process for decoding decompressing or decoding auto data depicted in accordance with a preferred embodiment of the present invention.

With reference now to FIG. 3, a flowchart of a process for decoding decompressing or decoding auto data is depicted in accordance with a preferred embodiment of the present invention. The process begins by receiving an encoded bit stream as input (step 300) in receiving the incoming bit stream, the process performs synchronization by searching the bit stream for a syncword. In receiving the encoded bit stream, the process performs error checking to determine whether a transmission error has occurred in the bit stream. Thereafter, the process decodes the bit allocation (step 302). Bit allocation is decoded to determine the number of bits used to code the quantized samples.

Next, the process decodes the scale factors (step 304). In accordance with a preferred embodiment of the present invention, 36 samples in one subband within a frame are divided into three equal parts of twelve subband samples and each part can have its own scale factor. For every subband with a non-zero byte allocation, the coded scale factor for that subband is read from the byte stream. The scale factor is multiplied with the relevant subband samples after requantization. The process then requantizes the samples (step 306). In quantizing, a signal is transformed into another signal having a finite number of predetermined magnitude values. In requantizing, this conversion is reversed. The process then performs subband synthesis using a synthesis subband filter (step 308). Then, Pulse Code Modulation (PCM) samples are output (step 310).

In accordance with a preferred embodiment of the present invention, except for subband synthesis, the process in FIG. 3 are steps known to those of ordinary skill in the art. More details on decoding audio data may be found in ISO-IEC/JTC1 SC29/WG11, *Coding Of Moving Pictures And Associated Audio For Digital Storage Media At Up to About 1.5 Mbits/s—Part 3: Audio*, DIS, 11172, April 1992.

Figure 4:
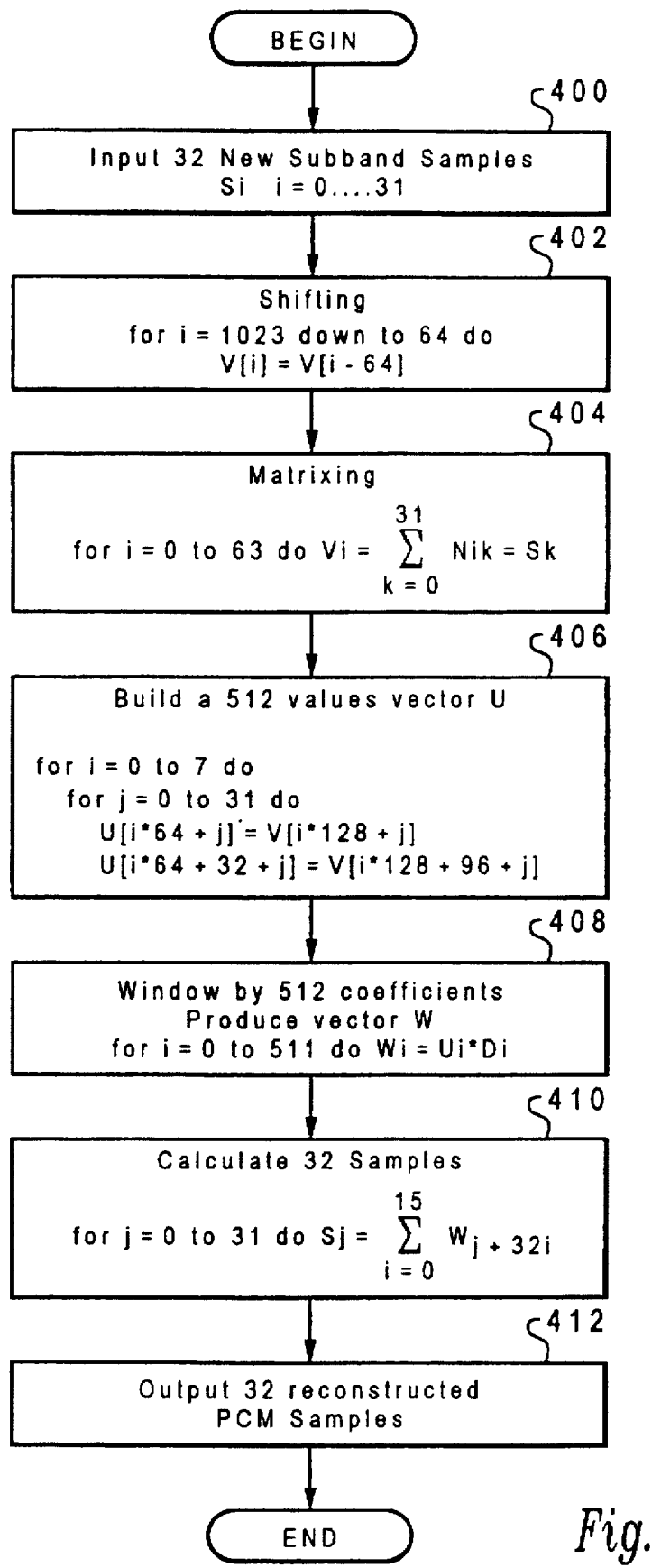
FIG. 4 is a flowchart of a process followed by a synthesis subband filter known in the art is depicted.

With reference now to FIG. 4, a flowchart of a process followed by a synthesis subband filter known in the art is depicted. The process begins by inputing 32 new subband samples, $S_i$ (step 400). Thereafter, shifting is performed for $V_i$ for i=0, 1, . . . , 63 where $V_i$ is set to Vi−64. i is an index number for the range 0 to 63 in the depicted embodiment. Then matrixing is performed for i=0 to 63 (step 404) as follows:

$$V_i = \sum_{k=0}^{31} N_{ik} S_k, \ i=0 \ldots 63 \qquad \text{Equation (1)}$$

Thereafter, values for vector U are created (step 405). Next, a vector W is produced (step 408). $D_i$ are window coefficients or the baseband filter coefficients. The process then calculates the PCM samples (step 410) as follows:

$$S_j = \sum_{i=0}^{18} W_{j+32i} \qquad \text{Equation (2)}$$

where $W_j = U_j \times D_j$. As a result, 32 reconstructed PCM samples are output by the synthesis subband filter (step 412).

Figure 5:
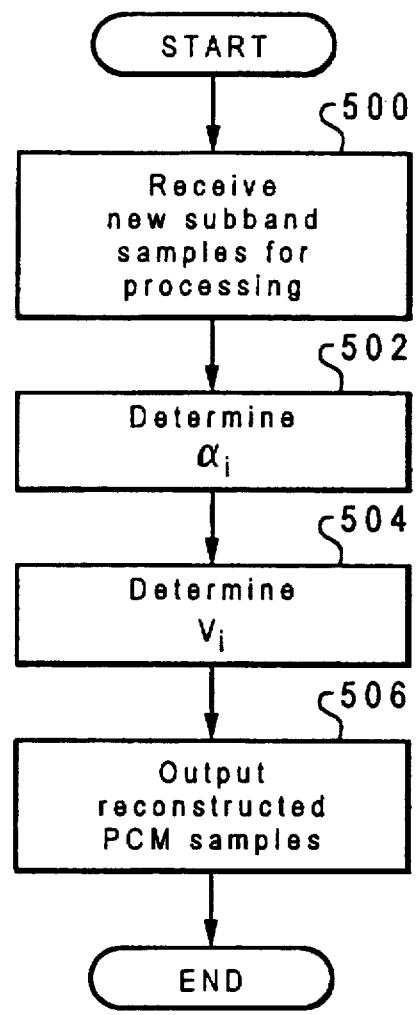
FIG. 5 is a flowchart of a process followed by a synthesis subband filter depicted in accordance with a preferred embodiment of the present invention.

With reference now to FIG. 5, a flowchart of a process followed by a synthesis subband filter is depicted in accordance with a preferred embodiment of the present invention. Once the initial decoding operations, error checking, bit unpacking and dequantization, are completed, subband samples are obtained. The synthesis subband filter reconstructs the 32 subband samples into 32 PCM samples using the process depicted in FIG. 5. The process begins by receiving 32 new subband samples for processing (step 500). Thereafter, the process determines $\alpha_i$ using a real value transform (step 502). The process then determines $v_i$ the reconstructed PCM samples (step 504), using the following:

$$v_i = 2 |\Re(\alpha_i) \cos(\mu_i) + \Im(\alpha_i) \sin(\mu_i)| \qquad \text{Equation (3)}$$

The process then outputs 32 reconstructed PCM samples (step 506). Within a synthesis subband filter, each time a new set of 32 samples are received, a new $\alpha_i$ is determined and the $v_i$ is calculated to produce PCM samples in accordance with a preferred embodiment of the present invention.

The first stage in the subband synthesis operation is to obtain intermediate values by using:

$$v_i = \sum_{k=0}^{31} n_{ik} s_k \quad i=0,1,\ldots,63 \qquad \text{Equation (4)}$$

where $s_k$, k=0, 1, . . . , 31 are the dequantized subband samples and $$n_{ik} = \cos\left[(16+i)(2k+1)\frac{\pi}{64}\right], \qquad \text{Equation (5)}$$

$$i = 0, 1, \ldots, 63, \quad j = 0, 1, \ldots, 31$$

For a 48 kHz original signal, there will be 1500 (32× 1500=48000) computations of Equation (4) per second. Storage requirement for the coefficients $n_{ik}$ is 64×32=2048 16-bit values. Each $v_i$ values, it requires 32×64=2048 16-bit values. Each $v_i$ calculation requires 32 multiply and add operations. Hence, for computing 64 $v_i$ values, it requires 32×64=2048 multiplies and adds. Considering that Equation (4) needs to be performed 1500 times per second, it is of interest to investigate the possibilities of using efficient algorithms for obtaining $v_i$. It turns out, as shown below, an improved algorithm can reduce the number of multiplications and additions required. Following the computation of $v_i$, simple windowing and summation operations may be used to reconstruct the PCM samples. Details can be found in ISO-IEC JTC1/SC2/WG11, *Coding of moving pictures and associated audio for digital storage media at up to about 1.5 Mbit/s, Part 3 Audio*, CD 11172-3, 1991.

Denote N=64 wherein N is a transform size in which N=64 is a 64 pt DFT. Rewriting Equation (4) obtains $$v_i = \sum_{k=0}^{N/2-1} \cos\left[(N/4+i)(2k+1)\frac{\pi}{N}\right] s_k \qquad \text{Equation (6)}$$

$$v_i = \frac{1}{2} \sum_{k=0}^{N/2-1} \exp\left[-j(N/4+i)(2k+1)\frac{\pi}{N}\right] s_k + \qquad \text{Equation (7)}$$

$$\frac{1}{2} \sum_{k=0}^{N/2-1} \exp\left[j(N/4+i)\frac{\pi}{N}\right] s_k$$

where $(j=)\sqrt{-1}$ Now let $v_i = 1/2(A_i + B_i)$. Expanding $A_i$ results in $$A_i = \sum_{k=0}^{N/2} \exp(-j2\pi ki/N) |s_k \exp(-jk\pi/2)| \exp(-ji\pi/N - j\pi/4)| \qquad \text{Equation (8)}$$

$$A_i = \alpha_i \exp(-j\mu_i) \qquad \text{Equation (9)}$$

where $$\alpha_i = \sum_{k=0}^{N/2-1} \exp(-j2\pi k/N) |s_k \exp(-(j2\pi k/N)(N/4))| \qquad \text{Equation (10)}$$

and $$\mu_i = \pi(i/N - 1/4) \qquad \text{Equation (11)}$$

It is easily seen that $\hat{\alpha}_i$, i=0, 1, . . . , N−1 is the N-point discrete Fourier transform (DFT) of the sequence $|s_k \exp(j\pi k/N)(N/4)|$, k=0, 1, . . . , N/2−1 and 0,k=N/2, N/2+1, . . . , N−1. But, from the DFT shift theorem described, $a_i = a_i + N/4$, where $\hat{\alpha}_i$ is the N-point DFT of the sequence $s_k$, k=1, 2, . . . , N/2−1 and 0,k=N/2, N/2+1, . . . N−1. $\hat{\alpha}_i$ is DFT of a real sequence. Hence following standard techniques found in A. V. Oppenheim and R. W. Schafer, *Digital Signal Processing*, Englewood Cliffs, N.J.: Prentice Hall 1979, one can obtain $\hat{\alpha}_i$ by one N/2 complex DFT and 2N multiplications and additions. A number of efficient techniques in implementing DFT for a real valued sequence known to those of ordinary skill in the art. A particularly useful set of techniques along with Fortran programs can be found in H. V. Sorenson, D. L. Jones, M. T. Heideman, C. S. Burrus, "Real-valued fast Fourier transform algorithms," *IEEE Transactions on Acoustics, Speech, and Signal Processing*, vol. ASSP-35, no. 6, ppp. 849–863, June 1987. Considering that N=64, a 32-point complex DFT can be calculated with 136 multiplications and 388 additions. This computation assumes that there should be three different butterfly subroutines to take advantage of multiplication by $\pm 1 \pm j$ and $\exp(jl\pi/4)$, integer l. ("The straight forward Cooley-Takey fast Fourier transform requires about 320 multiplications and 480 additions.") However, the three-butterfly approach increases the program code length.

Furthermore, one can remove 64 additions in the initial phase of the computations since the 32-point input sequence consists of 16 zero (complex) values. Note that the 32-point complex sequence is obtained from the 64-point real sequence by placing even samples on the real and odd samples on the imaginary parts of the complex sequence.

A requirement of 136 real multiplications and 324 real additions for computing $\alpha_i$ is present. Along with these, several indexing and table look-up operations are needed. The sine and consine values, totally $16 \times 2 = 32$, are to be stored. A 5-bit reversal counter is needed for unscrambling in the FFT operations. An efficient implementation of the FFT with Decimation in Time algorithm needs only about 16 indices since half of the input samples are zero considering this, it is advantageous to store the scrambled index table rather than use a counter. The output of the FFT needs to be shifted by 16 points (see the relationship between $a_i$ and $\hat{\alpha}_i$). This shifting operation need not necessarily consume arithmetic operations since a proper base address or offset along with modula counters should be sufficient for this purpose.

The final phase in computing $v_i$ involves evaluation of $B_i$ and adding it with $A_i$, the steps for computing $A_i$ are not repeated for $B_i$ since $B_i$ is the complex conjugate of $A_i$. $V_i$ can then be computed as $$v_j = 2|\Re(a_i) \cos \mu_i + \Im(a_i) \sin \mu_i|, \ i=0, 1, \ldots, 63 \quad \text{Equation (12)}$$

where $\Re(\ )$ indicates the real part and $\Im(\ )$ indicates the imaginary part. The above operations take 128 multiplications and 64 additions. Multiplication by 2 is achieved by shift-left operation. 64 additional storage locations will be needed for the sine and consine values in addition to the ones used for FFT computation above. To avoid increased programming effort, one may opt to store all 128 values.

Finally, one arrives at 264 multiplications and 324 additions to compute 64 values of $v_i$, i=0, 1, ..., 63. The required number of storages is 96 (160 if it is needed to reduce code size). The storage efficiency increases by using only one twentieth of the original scheme. In situations where only limited random access data memory is available for the signal processing system, this provides an excellent solution. The multiplication requirement is reduced by about 80 percent and the complexity due to additions is reduced by about 75 percent in accordance with a preferred embodiment of the present invention.

The solution lends itself to use the standard real data fast Fourier transform (EFI) routines with very minimal modifications. It may be noted that many of the DSP vendors provide optimized code for EFT which can be easily tailored for our purposes. Further computational reductions are also possible. For instance, Equation (12) can be combined at the final stages of the EFT butterfly computations to avoid a much as b4 multiplications and 64 additions which can give a computational complexity of about 200 multiplications and 260 additions.

While the invention has been particularly shown and described with reference to a preferred embodiment, it will be understood by those skilled in the art that various changes in form and detail may be made therein without departing from the spirit and scope of the invention.

What is claimed is:

1. A method of processing a digital data stream including a plurality of samples representing an audio signal, comprising:

requantizing the plurality of samples within the digital data stream; and filtering the plurality of requantized samples by performing subband synthesis on the plurality of requantized samples using a real valued fast Fourier transform to determine $\alpha_i$, where $\alpha_i$ is determined using:

$$\alpha_i = \sum_{k=0}^{N/2-1} \exp(-j2\pi k/N)|s_k \exp(-(j2\pi k/N)(N/4))|$$

where i is an index for summation, k is the number of requantized subband samples, $s_k$ are requantized subband samples, N is the transform size;

creating the plurality of requantized samples using:

$$v_j = 2|\Re(\alpha_i) \cos \mu_i + \Im(\alpha_i) \sin \mu_i|, \ i=0, 1, \ldots, 63$$

where $v_i$ are the pulse code modulated samples, j is $\sqrt{-1}$, and $\mu$ is an angle value and is equal to $\pi(i/N+1/4)$, wherein pulse code modulated samples are created from the plurality of requantized samples.

2. An apparatus for processing a digital data stream digital including a plurality of samples representing an audio signal, comprising:

requantizing means for requantizing the plurality of samples; and filter means for performing subband synthesis on the plurality of requantized samples using a fast Fourier transform, wherein pulse code modulated samples are created from the plurality of requantized samples, wherein the filter means implements a real valued fast Fourier transform to create pulse modulated samples from the plurality of requantized samples and includes:

means for determining $\alpha_i$ using the real valued fast Fourier transform, wherein $\alpha_i$ is determined using:

$$\alpha_i = \sum_{k=0}^{N/2-1} \exp(-j2\pi k/N)|s_k \exp(-(j2\pi k/N)(N/4))|$$

where i is an index for summation, k is the number of requantized subband samples, $s_k$ are requantized subband samples, N is the transform size; and means for creating the plurality of requantized samples using:

$$v_j = 2|\Re(\alpha_i) \cos \mu_i + \Im(\alpha_i) \sin \mu_i|, \ i=0, 1, \ldots, 63$$

where $v_i$ are the pulse code modulated samples, j is $\sqrt{-1}$, and $\mu$ is an angle value and is equal to $\pi(i/N+1/4)$.

3. An apparatus for processing a digital data stream digital including a plurality of samples representing an audio signal, comprising:

requantizing means for requantizing the plurality of samples; and filter means for performing subband synthesis on the plurality of requantized samples using a fast Fourier transform, wherein pulse code modulated samples are created from the plurality of requantized samples, wherein the filter means implements a real valued fast Fourier transform to create pulse modulated samples from the plurality of requantized samples aid includes a polyphase filter bank.

4. A data processing system, comprising:

an input for receiving a digital audio data stream including a plurality of samples;

a processor;

processor means for determining a bit allocation for the plurality of samples;

processor means for requantizing the plurality of samples in the digital data stream into subbands using the bit allocation determined for the plurality of samples; and processor means for filtering the plurality of requantized samples using a real valued fast Fourier transform to create pulse modulated samples from the plurality of requantized samples, wherein the processor means for filtering includes:

means for determining $\alpha_i$ using the real valued fast Fourier transform, wherein $\alpha_i$ is determined using:

$$\alpha_i = \sum_{k=0}^{N/2-1} \exp(-j2\pi k/N)|s_k \exp(-(j2\pi k/N)(N/4))|$$

where i is an index for summation, k is the number of requantized subband samples, $s_k$ are requantized subband samples, N is the transform size; and means for creating the plurality of requantized samples using:

$$v_j = 2[\Re(\alpha_i) \cos \mu_i + \Im(\alpha_i) \sin \mu_i], \ i=0, 1, \ldots, 63$$

where $v_j$ are the pulse code modulated samples, j is $\sqrt{-1}$, and $\mu$ is an angle value and is equal to $\pi(i/N+1/4)$.

5. A data processing system comprising:

an input for receiving a digital audio data stream including a plurality of samples;

a processor;

processor means for determining a bit allocation for the plurality of samples;

processor means for requantizing the plurality of samples in the digital data stream into subbands using the bit allocation determined for the plurality of samples; and processor means for filtering the plurality of requantized samples using a real valued fast Fourier transform to create pulse modulated samples from the plurality of requantized samples, wherein the processing means for filtering includes a polyphase filter bank.

6. A filter for processing a digital data stream including a plurality of samples representing an audio signal, the filter comprising:

input means for receiving the digital data stream;

processing means for filtering the plurality of samples within the digital data stream, the filtering means using a real valued fast Fourier transform to create pulse code modulated samples from the plurality of requantized samples; and output means for transmitting the pulse code modulated samples, wherein the processor means for filtering includes:

means for determining $\alpha_i$ using the real valued fast Fourier transform, wherein $\alpha_i$ is determined using:

$$\alpha_i = \sum_{k=0}^{N/2-1} \exp(-j2\pi k/N)|s_k \exp(-(j2\pi k/N)(N/4))|$$

where i is an index for summation, k is the number of requantized subband samples, $s_k$ are requantized subband samples, N is the transform size; and means for creating the plurality of requantized samples using:

$$v_j = 2[\Re(\alpha_i) \cos \mu_i + \Im(\alpha_i) \sin \mu_i], \ i=0, 1, \ldots, 63$$

where $v_j$ are the pulse code modulated samples, j is $\sqrt{-1}$, and $\mu$ is an angle value and is equal to $\pi(i/N+1/4)$.

7. A filter for processing a digital data stream including plurality of samples representing an audio signal, the filter comprising:

input means for receiving the digital data stream;

processing means for filtering the plurality of samples within the digital data stream, the filtering means using a real valued fast Fourier transform to create pulse code modulated samples from the plurality of requantized samples; and output means for transmitting the pulse code modulated samples, wherein the filter includes a polyphase filter bank.

* * * * *